(12) United States Patent
David et al.

(10) Patent No.: US 12,298,598 B2
(45) Date of Patent: May 13, 2025

(54) SYSTEM AND METHOD FOR FITTING EYE WEAR

(71) Applicant: BLINK TECHNOLOGIES INC., Palo Alto, CA (US)

(72) Inventors: Almog David, Kiryat Motzkin (IL); Gilad Drozdov, Haifa (IL); Tsahi Mizrahi, Yoqneam Ilit (IL)

(73) Assignee: BLINK TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 17/340,333

(22) Filed: Jun. 7, 2021

(65) Prior Publication Data

US 2022/0390771 A1    Dec. 8, 2022

(51) Int. Cl.
| | |
|---|---|
| G06K 9/00 | (2022.01) |
| G02C 13/00 | (2006.01) |
| G06T 7/50 | (2017.01) |
| G06T 7/60 | (2017.01) |
| G06T 7/73 | (2017.01) |
| G06V 40/16 | (2022.01) |
| G06V 40/18 | (2022.01) |

(52) U.S. Cl.
CPC .............. *G02C 13/005* (2013.01); *G06T 7/50* (2017.01); *G06T 7/60* (2013.01); *G06T 7/73* (2017.01); *G06V 40/161* (2022.01); *G06V 40/18* (2022.01); *G06T 2207/20084* (2013.01); *G06T 2207/30041* (2013.01); *G06T 2207/30201* (2013.01)

(58) Field of Classification Search
CPC ........... G02C 13/005; G06T 7/50; G06T 7/60; G06T 7/73; G06T 2207/20084; G06T 2207/30041; G06T 2207/30201; G06V 40/161; G06V 40/18
See application file for complete search history.

(56) References Cited

U.S. PATENT DOCUMENTS

| | | | |
|---|---|---|---|
| 9,086,582 B1 * | 7/2015 | Barton | ................... A61B 3/111 |
| 9,529,213 B2 * | 12/2016 | Fonte | ........................ G16B 5/00 |
| 10,495,901 B2 * | 12/2019 | Gamliel | ............... A61B 3/0025 |
| 11,262,273 B2 * | 3/2022 | Gueu | ..................... G06V 40/19 |

(Continued)

FOREIGN PATENT DOCUMENTS

| | | | |
|---|---|---|---|
| CN | 110135391 A | * | 8/2019 |
| EP | 0503432 A2 | * | 9/1992 |

(Continued)

OTHER PUBLICATIONS

Current State of Anthropometric Parameters Measurement with Relevance for Advanced Lens Optometric Compensation, George Baboianu et al., Springer, 2019, pp. 138-148 (Year: 2019).*

(Continued)

*Primary Examiner* — Jayesh A Patel
(74) *Attorney, Agent, or Firm* — AlphaPatent Associates Ltd.; Daniel J. Swirsky

(57) ABSTRACT

A computer implemented method and system for fitting eyeglasses captures images of the consumer while naturally (Continued)

trying-on frames in the normal course of selecting new frames. The system and method capture natural images of frame placement and using gaze prediction and eye tracking techniques ascertain eye measurements for accurate placement of the prescription within new eyewear.

20 Claims, 15 Drawing Sheets

(56) References Cited

U.S. PATENT DOCUMENTS

| | | | |
|---|---|---|---|
| 2003/0123026 A1* | 7/2003 | Abitbol | G06Q 30/0641 |
| | | | 351/204 |
| 2014/0257839 A1* | 9/2014 | Suter | G06Q 10/10 |
| | | | 705/2 |
| 2017/0000683 A1* | 1/2017 | Samec | A61B 3/1005 |
| 2018/0164609 A1* | 6/2018 | Liang | A61B 3/10 |
| 2018/0232575 A1* | 8/2018 | Strombom | A61B 3/113 |
| 2019/0196221 A1* | 6/2019 | El-Hajal | G02C 7/027 |
| 2020/0393704 A1* | 12/2020 | Teodorovic | G06T 11/60 |
| 2021/0012525 A1* | 1/2021 | Barton | G02C 13/005 |
| 2021/0215953 A1* | 7/2021 | Fonte | G06F 3/013 |
| 2021/0382329 A1* | 12/2021 | Ohlendorf | G01M 11/0228 |
| 2022/0222847 A1* | 7/2022 | Barton | G06V 10/82 |
| 2022/0276511 A1* | 9/2022 | Varady | G06V 10/44 |

FOREIGN PATENT DOCUMENTS

| | | | | |
|---|---|---|---|---|
| EP | 2560041 A2 | * | 2/2013 | G01C 9/12 |
| EP | 3128362 A1 | * | 2/2017 | G01M 11/0207 |
| EP | 3502769 A1 | * | 6/2019 | G01M 11/0207 |
| WO | WO-2006079540 A9 | * | 10/2009 | G02C 13/003 |
| WO | WO-2017021480 A1 | * | 2/2017 | G01M 11/0207 |
| WO | WO-2018069164 A1 | * | 4/2018 | A61B 3/111 |
| WO | WO-2018208585 A1 | * | 11/2018 | A61B 3/0025 |
| WO | WO-2018230526 A1 | * | 12/2018 | G06F 3/01 |

OTHER PUBLICATIONS

A Virtual Try-On System for Prescription Eyeglasses, Qian Zhang et al., IEEE, 2017, pp. 84-93 (Year: 2017).*

Vision-Based Virtual Eye Glasses Fitting System, Wan-Yu Huang et al., IEEE, 2013, pp. 45-46 (Year: 2013).*

GAZE-2: Conveying Eye Contact in Group Video Conferencing Using Eye-Controlled Camera Direction, Roel Vertegaal et al., Chi New Horizons, 2003, pp. 521-528 (Year: 2003).*

* cited by examiner

Feature Extraction Block (FET)

| Kernel Size(N,N, Channels) 2D-Convoluation | → | Batch Normalization | → | Dropout | → | ReLu |

L2-error on pixel: 
$$\|\mathbf{x}\|_2 = \left(\sum_{i=1}^{N} |x_i|^2\right)^{1/2} = \sqrt{x_1^2 + x_2^2 + \ldots + x_N^2}$$

Cross Entropy: Softmax → Cross-Entropy Loss $$f(s)_i = \frac{e^{s_i}}{\sum_j^C e^{s_j}} \qquad CE = -\sum_i^C t_i log(f(s)_i)$$

pantoscopic tilt

SYSTEM AND METHOD FOR FITTING EYE WEAR

TECHNICAL FIELD

The present disclosure relates to eye care, and more particularly, to a method and system for seamlessly capturing images of a user trying on eyeglass frames to acquire the user's measurements that will be employed in the generation of lens manufacturing instructions.

BACKGROUND

For prescription eyewear to fit properly, the prescription must be accurately placed within the lenses so that when the consumer places the glasses on their face, the prescription is in the correct position for their unique features. The current standard for accurate placement of the prescription in new lenses involves the consumer having a series of measurements taken manually by an eye care professional.

The eyecare professional generally takes measurements to determine the interpupillary distance, including either monocular or binocular pupillary distance using the ocular center, fitting or frame height, A and B pantoscopic tilt, wrap, vertex, and dominant eye. Depending upon the type of glasses being purchased (readers, distance, bi-focal, tri-focal, etc.) different pupillary distance measurements may be used, and their selection and application are well understood by the skilled artisan. The remaining measurements are generally frame specific and relate to how the frames sit on the face of the wearer. Fitting height or frame height generally refers to the length of lens above and below the midline of the pupil. Vertex refers to the distance between the front of the eye and the frame measured perpendicular to the eye at the pupil. Pantoscopic tilt measures the extent to which the lens does not sit parallel to the eye and wrap looks at the bow or the dihedral angle between the lens and the eye. These measurements are discussed in more detail with reference to FIGS. 7-13.

These measurements are used to direct the placement of the consumer's new prescription within the new lenses associated with their frames. These steps have routinely been carried out in the establishment where new eyewear is purchased; however, with the advent of on-line shopping, many consumers are now buying their eyewear directly from manufacturers. For some shoppers, they buy their frames on-line and take them to their optometrist and have appropriate corrective lenses fitted and placed into them. For others, they can purchase their glasses on-line and upload their prescriptions to have lenses made to fit the frames. In this instance, virtual frames are used in conjunction with a camera on a smart device to take measurements.

Other methods and systems have also been developed to improve the automating of these measurements. In one system manufactured by Esillor, the consumer may present themselves at a digital reading station with their frames or use an automated kiosk which may be found in their optometrist's office. With this kiosk system, a reference template is placed over the consumer's desired frames, and the necessary measurements are generated by the system from the markers on the reference template frame.

U.S. Pat. No. 9,529,213, assigned to Bespoke, discloses a system for creating custom eyewear. The system and method use an image capture module to generate an anatomic model of a user based upon the captured image, a configuration module to create a custom eyewear frame based upon the user image, and a display module to display the virtual custom eyewear frame on the virtual face of the user. The system also provides customized product information to a manufacturer to create the custom eyewear frame.

Published U.S. Patent Application No. 2003/0123026, discloses a system and method for virtually trying-on and fitting glasses to the face of a user. The process includes generation of a 3D image of the user's face and generation of a virtual image of the eyeglasses which are placed on the user's image. From this virtual image and frames, the system can generate at least one parameter for customizing the manufacture and cutting of lenses for the frames.

U.S. Pat. No. 10,495,901, assigned to Shamir Optical Industry, Ltd., discloses a system and method that attempts to match the correct lenses with the prescription and lifestyle of the user. The system uses a mobile sensor that is carried by the user which is associated with a value measurer configured to measure a plurality of values in the user's environment based upon the sensor. These values are then used to create a behavioral index that is used in selecting the most appropriate lenses for the user based upon his environment.

Published U.S. Patent Application No. 2015/0160474 assigned to International Business Machines, discloses a system that can be used to improve the placement of a prescription within a lens by making a prototype lens including the prescription and running a simulation with the consumer wearing the lens. During the simulation, pupillary movement is measured and the system then generates a visual comfort assessment that can include instructions for changes to the prescription placement on the lens to improve the consumer's comfort.

Each of the foregoing systems and method, including the direct measurement by an eye care professional, suffer from one or more drawbacks making them less than ideal for accurately fitting eyewear frames in the manufacture of custom prescription lenses. The systems and methods as described herein overcome the deficiencies in the prior art and are able to identify frame placement unique to the consumer using images of the consumer that are captured while trying on one or more pairs of frames. The method and system as described capture consumer images while the consumer is trying on frames in the normal course of selecting new frames. By capturing natural images rather than requiring forced placement of the frames and reference template (like the kiosk, the virtual frame, and the eye-care professional routinely use), the system as described can determine the most natural placement of the eyewear on the face of the consumer and can calculate the necessary measurement from this position, rather than the artificial placement required during typical measuring. Capturing natural placement images allows the system to generate a better prescription placement within the lenses and thereby create customized lenses having superior fit and wearability. In addition, the system can take all of the necessary measurements without the user's awareness or involvement in real time, making this very useful for eye care professionals.

The system and method as described can be applied without the need for a template or other measuring tools by using sophisticated eye tracking techniques that allow the capture, clarification, and analysis of natural eye images. The system and method position a number of landmarks on the image of the face and can therefore evaluate each eye individually, and both eyes together using point-of-regard (POR) to ascertain asymmetries between the eyes, pupil placement and size, and eye dominance among other things.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the Figures are not necessarily drawn to scale. Throughout this disclosure, depending on the context, singular and plural terminology may be used interchangeably.

DETAILED DESCRIPTION

Overview

Figure 1:
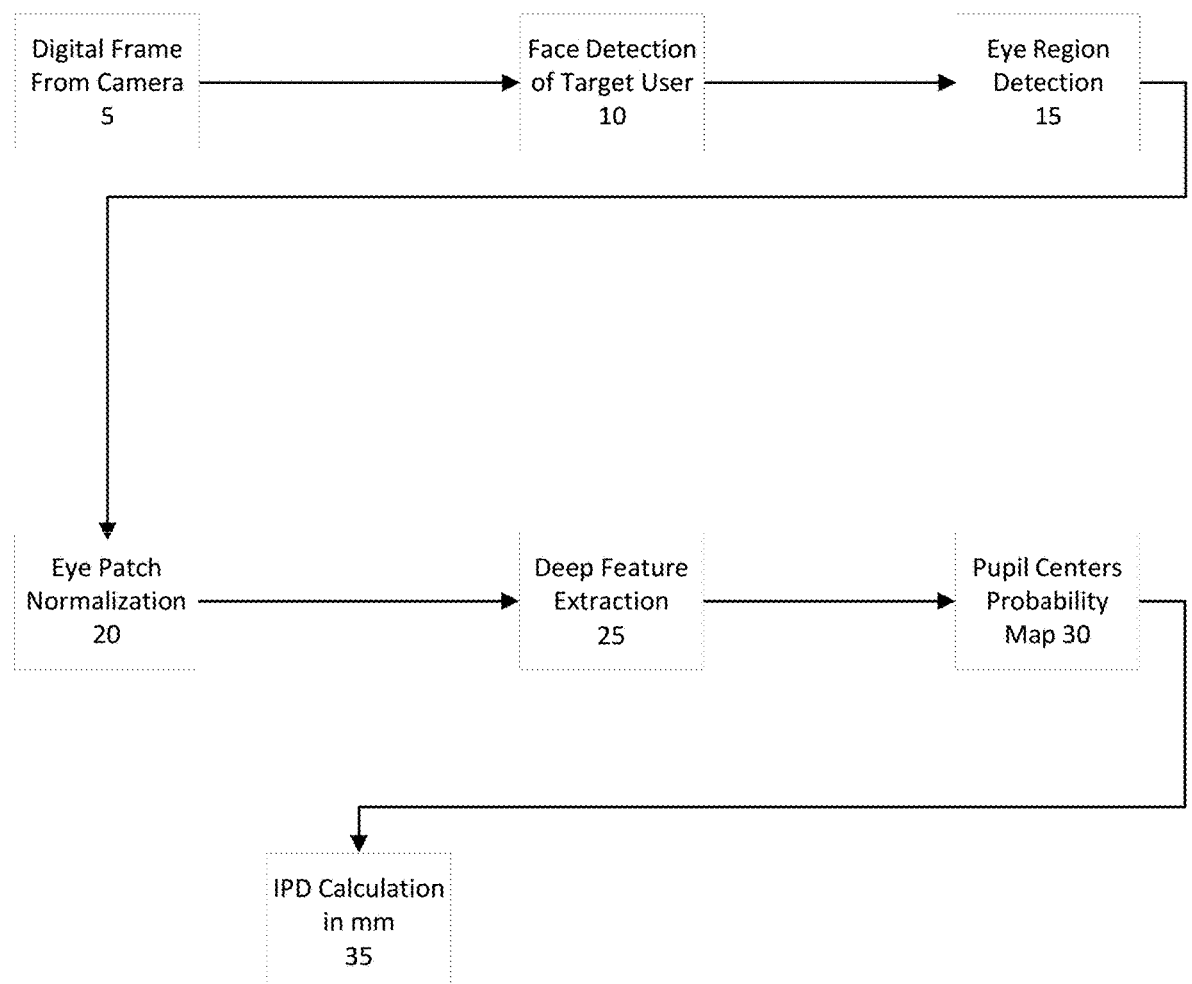
FIG. 1 is a flow chart illustrating one exemplary method for calculating interpupillary distance for fitting eyewear according to the instant disclosure.

The eyewear fitting (EF) systems and methods disclosed herein improve the fitting of eyewear to a consumer without the need for complex templates or physical measurement by an eyecare professional. The system and method use eye tracking techniques to take measurements based upon images or video of the consumer wearing their existing glasses or trying on one or more new frames during purchase. The EF system and method as described use natural head and glass positioning to measure and understand the unique orientation that the consumer makes of their eyeglasses on their face.

According to one embodiment, the method is a computer-implemented method which captures, by way of one or more cameras, images of a user seamlessly trying on eyeglass frames; generates, from the images, one or more dimensions of the eyeglass frames; and generates, from the images and the frame dimensions one or more measurements chosen from inter-pupillary distance, back vertex distance, and pantoscopic tilt.

According to another embodiment, the system includes a processor and a memory for storing computer executable instructions. The processor is configured to execute the instructions to capture, by way of one or more cameras, images of a user seamlessly trying on eyeglass frames; generate, from the images, one or more dimensions of the eyeglass frames; and generate, from the images and the frame dimensions one or more measurements chosen from inter-pupillary distance, back vertex distance, and pantoscopic tilt.

According to yet another embodiment, the system can capture natural images of the consumer trying-on their new frames and using those natural images to provide the measurements used to manufacture their new prescription lenses with improved accuracy. According to still another embodiment, the EF system and method can take measurements relative to eyewear the consumer already has or while trying on frames and can extrapolate that information to their new prescription and new frames.

In another embodiment, the EF system can generate a measurement set specific to the consumer and their desired eyeglass frames that may be used by the eyecare professional to order the manufacture of their prescription lenses. In still another embodiment, the EF system may directly generate manufacturing instructions for the new lenses that take into account not only the new prescription and new frames, but also the unique manner in which the individual orients their frames relative to their face.

The method and system as described allow for a substantial improvement in the placement of the prescription within the lenses so that the user has their best visual experience. These and other advantages of the present disclosure are provided in greater detail herein.

Illustrative Embodiments

The disclosure will be described more fully hereinafter with reference to the accompanying drawings, in which exemplary embodiments of the disclosure are shown, are not intended to be limiting.

The uniqueness of an individual's eyes and face make it impossible to properly fit eyewear using any standardized measurements. Further, physiologically the appearance of the human eye structure is different (size of the eye and visible opening of iris and sclera) from its internal (not visible) structure (location of fovea and optical limitation (e.g., cataract, amblyopia, astigmatism etc.). Still further, individuals have different ocular dominance or eyedness (left, right, none). Understanding the individual eye features is important to assuring accurate placement of the consumer's prescription in the new lenses.

When determining proper placement of a prescription for a consumer, the lens manufacturer requires certain measurements to accurately align the prescription in each of the lenses individually so that when the lenses are fitted into their frames, the consumer will have the same visual acuity as they did in the optometrist's office.

The system and method as described herein improves upon both the manual and automated measurement systems that exist by using gaze estimation and eye tracking to take the consumer's measurements including pupillary distance, pantoscopic tilt, vertex and wrap based upon images or video of the consumer wearing a set of frames, either existing eyeglasses or new frames.

As used herein "seamlessly" is defined as the capturing of images that are not posed allowing the user to drastically change his position relative to the camera and requiring no particular frame of reference, nor is the user instructed to adjust his head or eyewear.

Natural images of the consumer can be captured as digital frames using one or more image capture devices. According to one embodiment, the digital frame is captured from a single camera, a pair of synced cameras, an IR, grayscale, or VIS (RGB or RBG-D) digital camera or any other art recognized device for capturing a digital depiction of the user. According to one embodiment, the camera(s) is mounted behind a mirror that the consumer will use to assess their image while they try-on new eyeglass frames. Appropriate camera calibration should be carried out based upon the type and number of cameras being used and their relative position. This process is generally carried out independent of and before the user engages the system.

According to one embodiment, the method as described measures both the distance between the eye and the center of the head of the user from the camera, display or mirror. This measurement, in combination with a measurement of gaze fixation allows the system to differentiate between near and far inter-pupillary distances.

According to one embodiment, the system employs a gaze prediction algorithm which allows the model to output (X, Y) coordinates, conventionally measured from the top left corner of the display, to establish the user point-of-regard (POR). Gaze prediction is the POR, i.e., the 2D location on the display (in this case the mirror) of the gaze direction combined with the 3D eye location in space. Gaze prediction allow differentiation of near/far Inter-pupillary distance (IPD). Gaze prediction and POR together can improve accuracy in pupil location and interpupillary distance measurements.

From the images of the consumer, those frames that show the face of the consumer will be extracted. From those images, selection may be made of the images that will show the position of the face with respect to the camera, i.e., head pose (6-DoF) and those images that will show an eye patch. When selecting images for the eye patch, the image should clearly show the eye surrounded by a small region around the sclera. DoF refers to the number of ways the object can move in 3D-space. There are six total degrees of freedom and three correspond to rotational movement around the x, y, and z axes.

When capturing natural images, compensation for degraded images should be undertaken. Images of the eye may be degraded asymmetrically as a function of face pose (6-DoF), eye pose (2-DoF), illumination, lens glare, or other physical abstractions. The images may also include invalid head-poses or eye-blinks that should be eliminated.

Once the images are selected, the images will be evaluated for POR to confirm the user's focal length coincides with one or more objects in the mirror. As the images are obtained while the user is trying on new glasses, his POR should be his own image in the glass while trying on the frames. Using these images means that the user is fixating on a point within his natural view and in the same manner he would use when wearing his glasses in the ordinary course. This POR will be very similar to the one he would use for any digital display or other activity using his new glasses.

From the images a feature map will be extracted and a probability map will be generated using a deep convolutional neural network. From the probability map, pupil localization will be determined. The neural network is trained to have a very accurate localization of the pupil over a wide range of populations and under the refraction of a wide range of lenses. This allows the system to compensate for this these effects when they are encountered. As opposed to a single or even series of measurements, the system develops a full probability map of the location of the pupil, from which the pupil location can be ascertained to sub-pixel accuracy.

Next, regarding the frames, glass-rim segmentation will be performed based upon known 3D CAD models of the frames. The system will match key points on the frames that correspond to left and right pupil center, the frame bridge, and the lowest and highest points on the lenses. Then, based upon the frame measurements and the pupil locations, the system will then calculate the 3D position of the back vertex, both near and far interpupillary distance, the distance between the lenses and the pantoscopic angle. This will be explained in further detail with regarding to an exemplary embodiment below.

An exemplary embodiment of the method is set forth FIG. 1. As seen in FIG. 1, the first step 5 in the exemplified method is to locate a digital frame from the images uploaded by the consumer. In the next step, 10, the image is scanned to determine whether the face of the consumer can be clearly detected. If the face can be clearly detected, then the system will assess whether the eye region can be clearly detected in step 15. Once the eye region is clearly detected, an eye patch is normalized 20. Feature maps 25 and pupil center location probabilities 30 are determined using a deep convolutional-neural-network (DNN) Finally, the inter-pupillary distance is calculated in mm.

Now considering the example above in more detail, the camera output will by an n×m matrix with a single multiplier if the camera is grayscale or a multiplier of three (RGB) if the camera is color. Each frame will be a multichannel matrix of the pixels within that frame.

Figure 15:
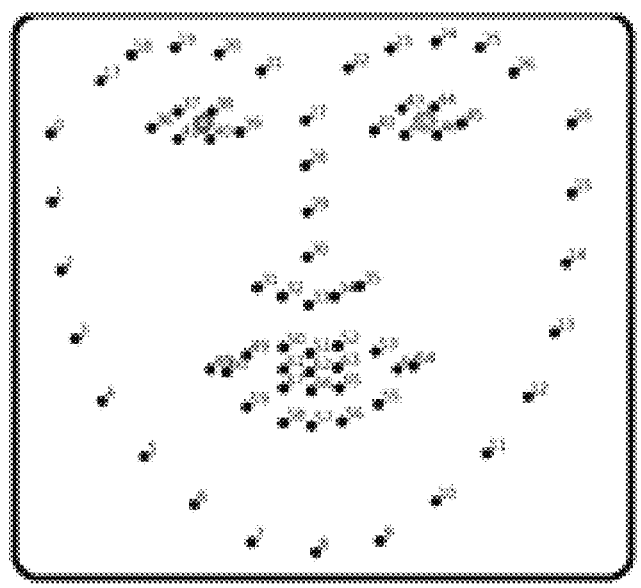
FIG. 15 illustrates one embodiment of a landmark capture for a facial image.

Face detection is carried out using a list of structured face objects that are identified. According to one embodiment, the face detection outputs will include a crop of the face, a bounding box of the face with respect to the frame, a user ID (if the consumer previously had other IPD matching done), and head pose. Any art recognized image recognition software can be used to select the facial images. During the construction of the feature map as discussed herein, a number of landmarks can be added to the facial images which allows the system to estimate, not only the pupil position, but also the distance between the eyeglass frames and certain points on the face or eyes. According to one embodiment, the system captures more than 65 landmarks, an example of which can be seen in FIG. 15.

From the frames selected one or more eye patches are chosen and extracted in a pixel size of between 128×128 to 512×512 depending upon the particulars of the camera's field of view (FOV) or resolution.

Once eye patches are extracted, they are normalized to an image intensity which is a gaussian normal distribution. Normalizing to a gaussian normal distribution refers to the application of a gaussian filter to the image to remove extraneous noise and generate images having improved edge detection.

Figure 2:
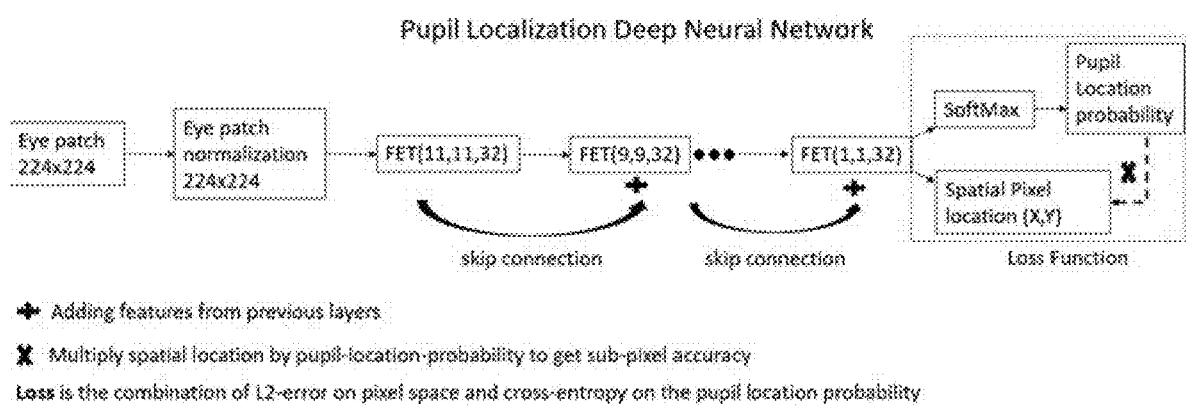
FIG. 2 is a flow chart illustrating one embodiment of how a deep neural network (DNN) is used in pupil localization.
Figure 3:
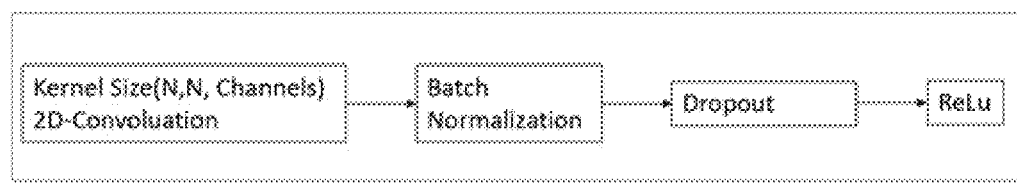
FIG. 3 is an algorithm used in one embodiment for feature extraction.
Figure 3:
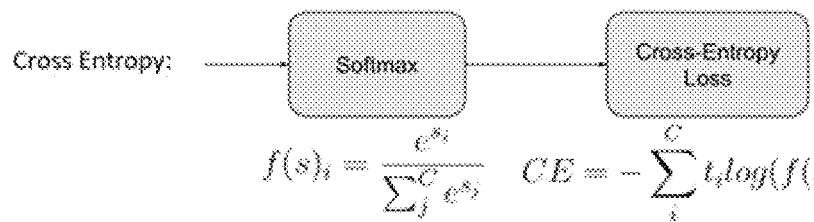

FIG. 2 illustrates the method of pupil localization from the captured images. After the eye patches are extracted, a feature map is developed by using a deep convolutional neural network and a Feature Extraction Block (FET), for example, illustrated in FIG. 3. A SoftMax function is applied to the feature maps to generate location probabilities for the pupil, which are then translated to pixel locations associated with the pupil. The SoftMax function is a normalized exponential function where the input vector is normalized to a probability distribution that sums to 1. A block diagram representation of pupil location can be seen in FIG. 6.

Pseudo code describing the pupil localization of FIG. 2 includes:
1. Input based on camera/distance 224×224×1 (function of FOV/distance)
2. Normalize to STD=1, Mean=0. Per image.
3. Conv-Layers for FE+NB+Dropout. (stride-1 and no padding).
4. Adding features from different scales using skip connections.
5. 1×1×32×—average over all feature channels through the multi-scale skip connection to accumulate the features from all scales.
6. Calculation of SoftMax—generates prob. Map On pupil location.
7. In spatial pixel domain—we the average pixel location, which is calculated from the probability multiplied by 224×224 features maps to achieve sub-pixel resolution.
8. The combined Loss is: L2 on pixel space and cross-entropy on the SoftMax.

Figure 4:
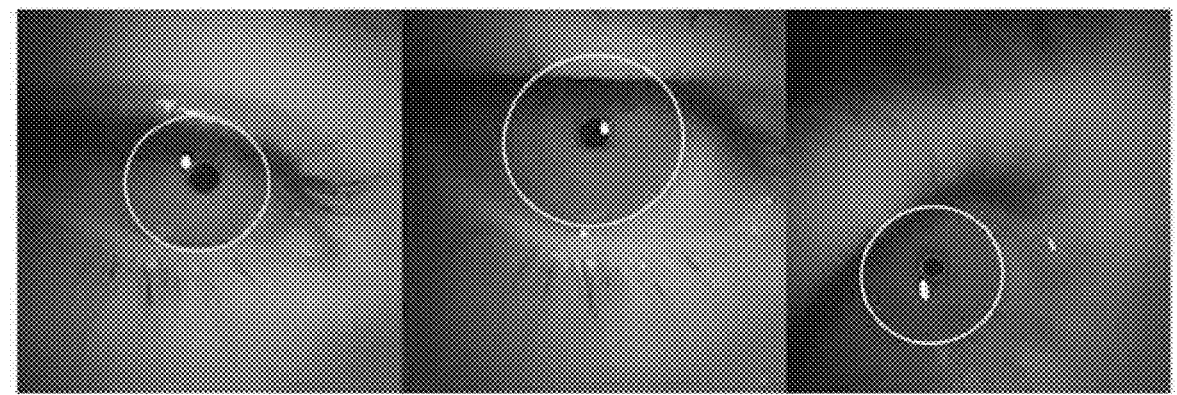
FIG. 4 illustrates views of extracted eye-patches with no glasses used to ascertain pupil position.
Figure 5:
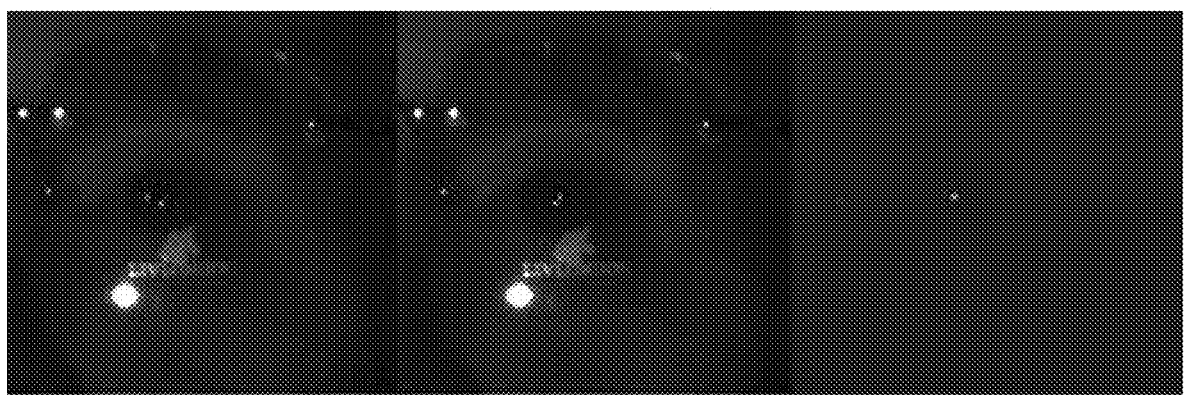
FIG. 5 illustrates views of extracted eye-patches with glasses used to ascertain pupil position.

FIGS. 4 and 5 show extracted eye patches will clear views for pupil extraction both without glasses (FIG. 4) and with glasses (FIG. 5). As can be seen in FIG. 5, the presence of lenses and glare can make pupil location much more difficult, but still possible using the technique described.

From the various images, a 3D estimation is made of the pupil center for both the left and right eyes. The inter-pupillary distance (IPD) is then calculated based upon the 3D distance of left and right pupil. The calculation is averaged across a number of frames, e.g., 10 to 50, for example 30, with removal of outlier's and a 10% standard deviation.

Figure 7:
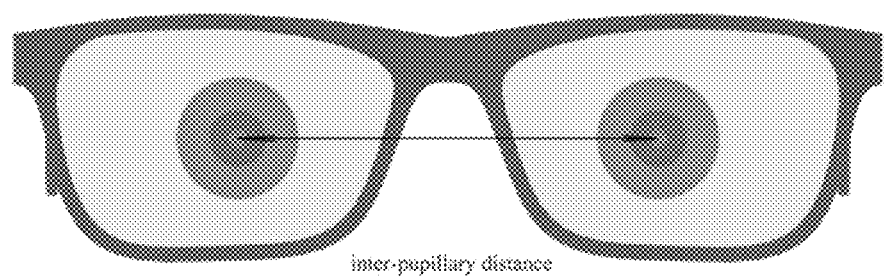
FIG. 7 illustrates the measurement of inter-pupillary distance.
Figure 8A:
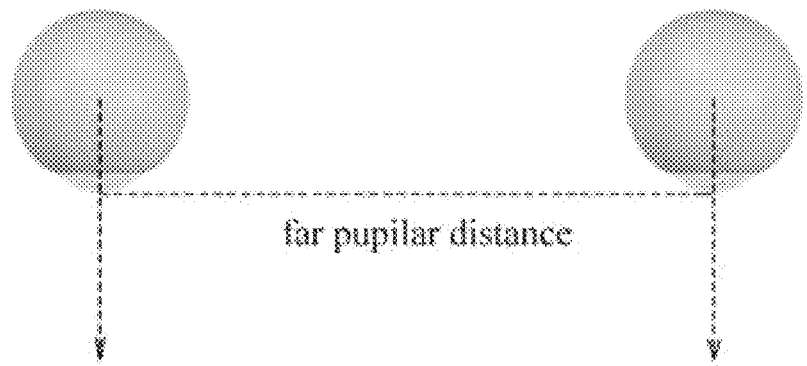
FIGS. 8A and 8B illustrate far and near inter-pupillary distance, respectively.
Figure 8B:
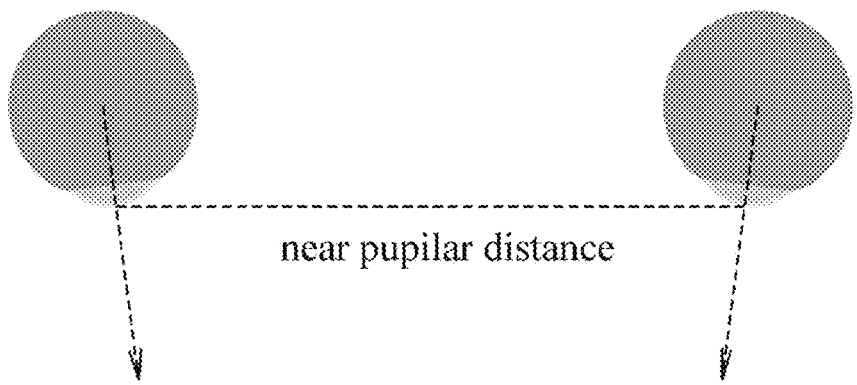
Figure 9:
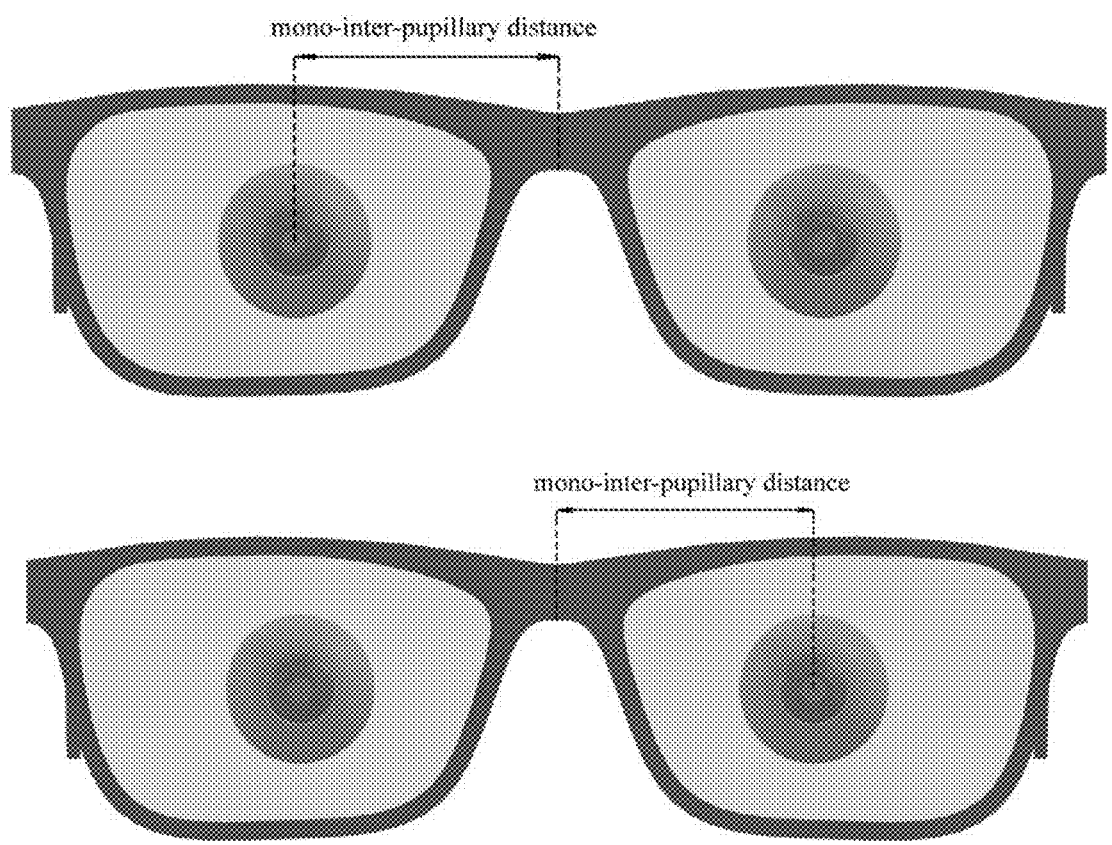
FIG. 9 illustrated mono-inter-pupillary distance for the right and left eyes.

FIGS. 7-13 illustrate the measurements that are calculated based upon the pupil location and the key points noted on the frames. FIG. 7 illustrates inter-pupillary distance. Far inter-pupillary distance, shown in FIG. 8A is measured when the POR is between 100 and 300 cm. Near inter-pupillary distance, shown in FIG. 8B, is measured when the POR is between 20 and 30 cm. FIG. 9 illustrates mono-inter-pupillary distance for the right and left eyes measured from the pupil center to the center of the bridge on the eyewear frame.

Figure 10A:
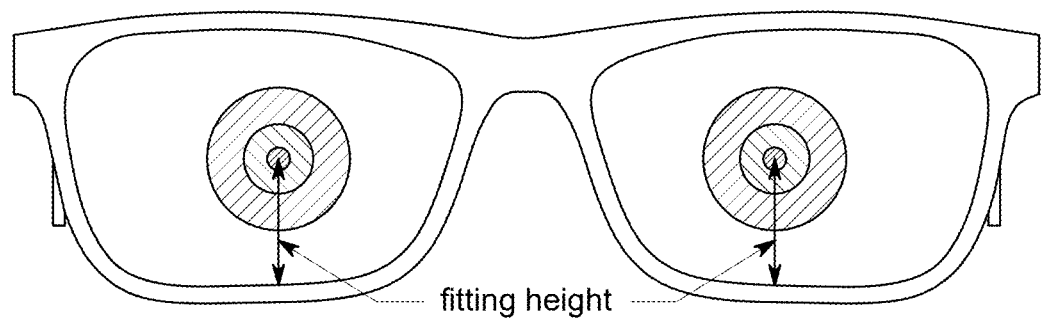
FIGS. 10A and 10B illustrate the fitting height from frame and the fitting height.
Figure 10B:
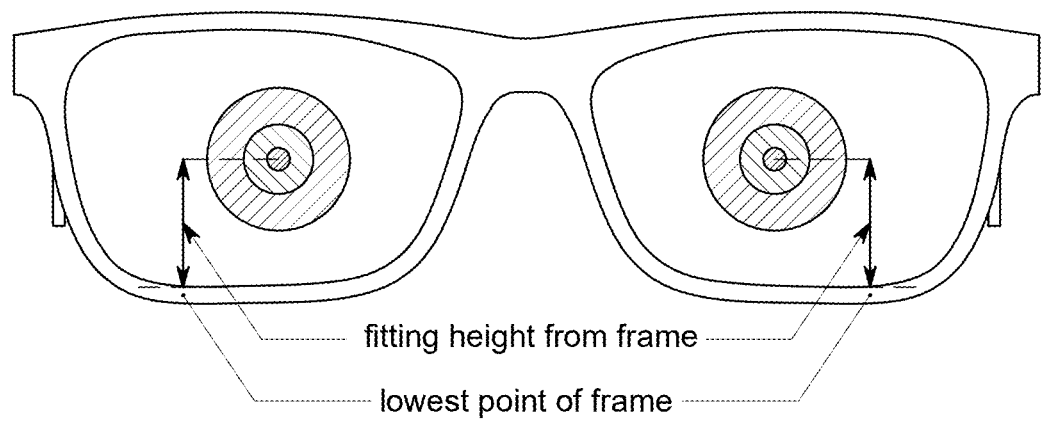

FIGS. 10A and 10B illustrate the measurement for fitting height and fitting height from the frame. Fitting height, seen in FIG. 10A, is the distance between the center of the pupil and the point on the frame directly below the pupil, and fitting height from the frame is the distance between the center of the pupil and the lowest point on the frame.

Figure 11A:
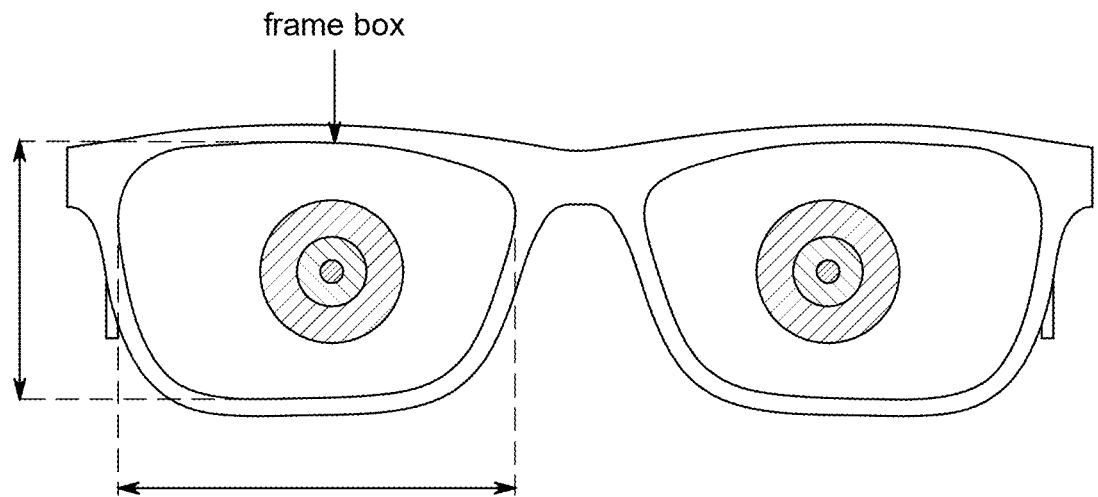
FIGS. 11A and 11B illustrate frame box measurements.
Figure 11B:
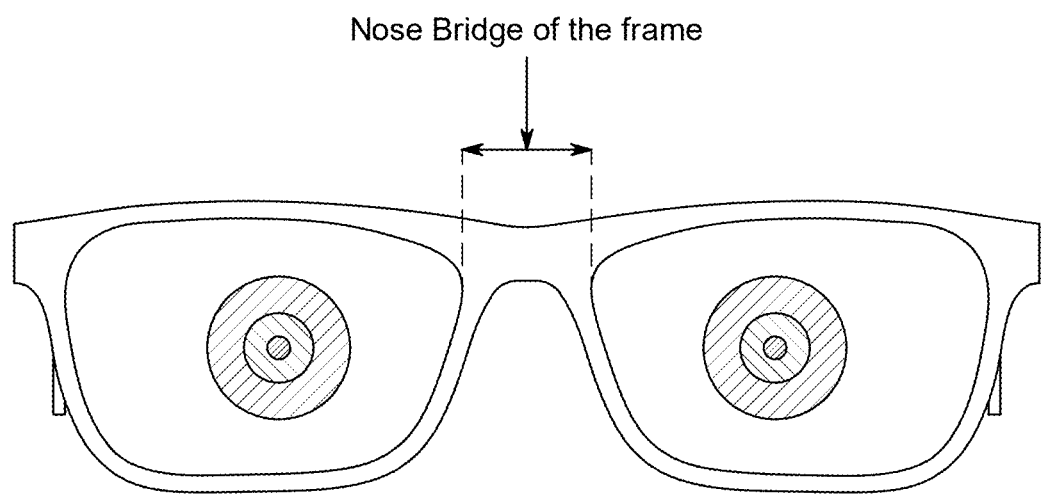

FIGS. 11A and 11B illustrate the lens box measurements. The lens box is assessed based upon its maximum horizontal length and its maximum vertical length and the bridge distance between the lens boxes.

Figure 12:
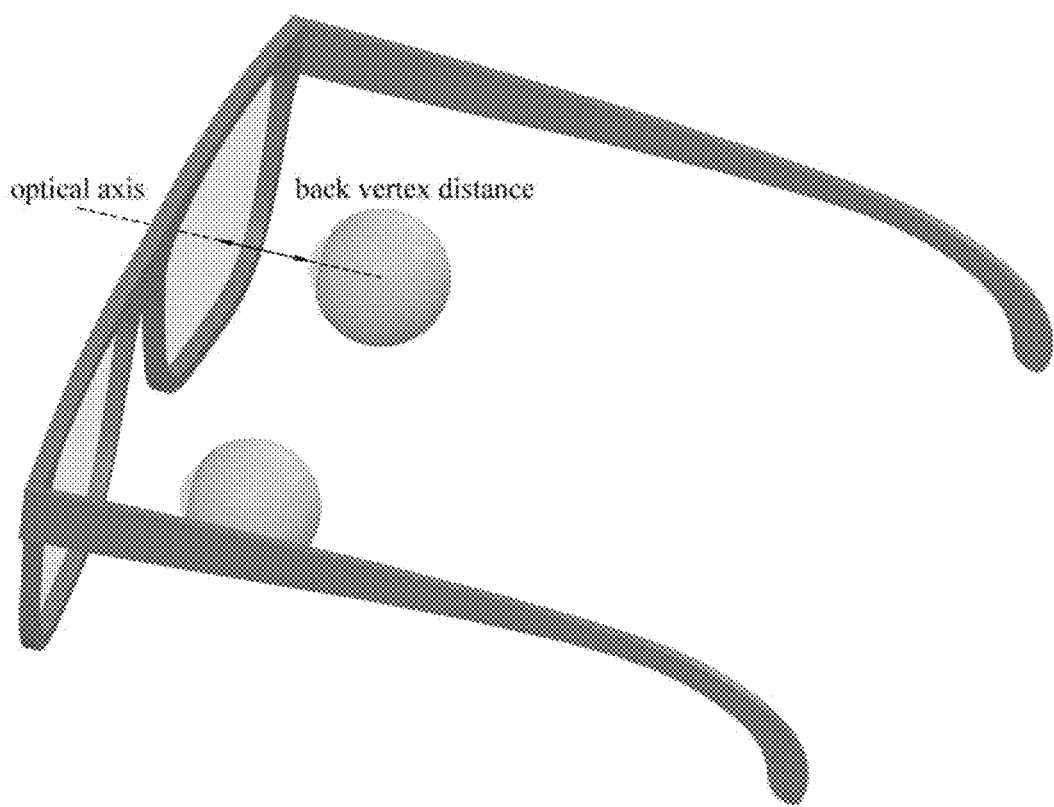
FIG. 12 illustrates the measurement of back vertex distance.

FIG. 12 illustrates the measurement for back vertex distance which is the distance between the front of the eye and the lens.

Figure 13:
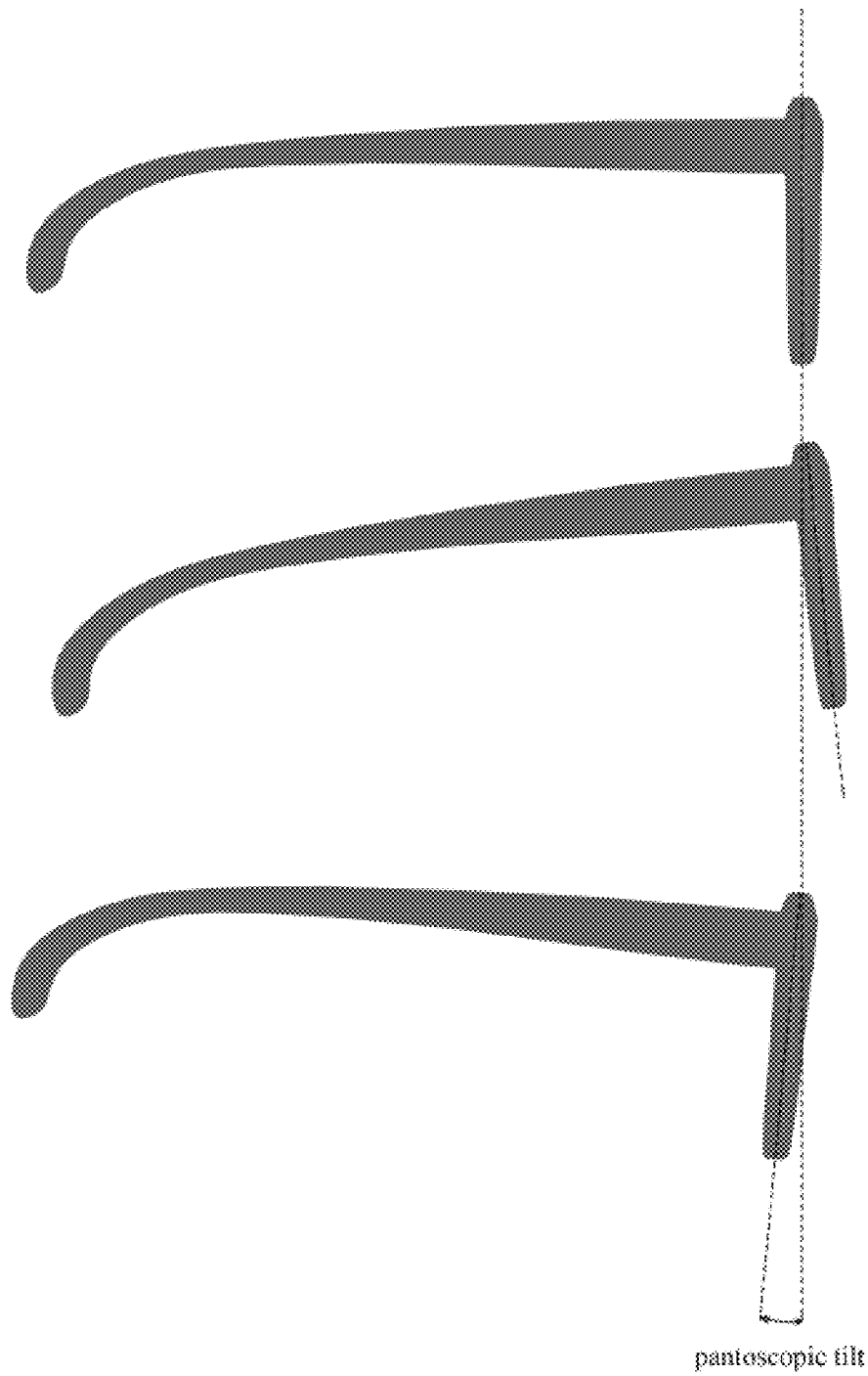
FIG. 13 illustrates measurement of pantoscopic tilt.

FIG. 13 illustrates pantoscopic tilt and how ear location can change the tilt angle of the frames.

The system and methods as described use gaze estimation and eye tracking including calibration for mid-range and long-range applications to measure interpupillary distance. Included in the term "mid-range" refers to cases when the reference camera is situated between 30-80 cm from the user's eyes. Included in the term "long-range" refers to cases when the reference camera is situated between 100-300 cm from the user's eyes.

Unlike prior automated systems, the system and method as described may be used to fit both clear and dark lenses (sunglass lenses or photochromic lenses). In addition, the system and method as described can be applied to rimmed, partially rimmed, or un-rimmed frame styles.

Figure 6:
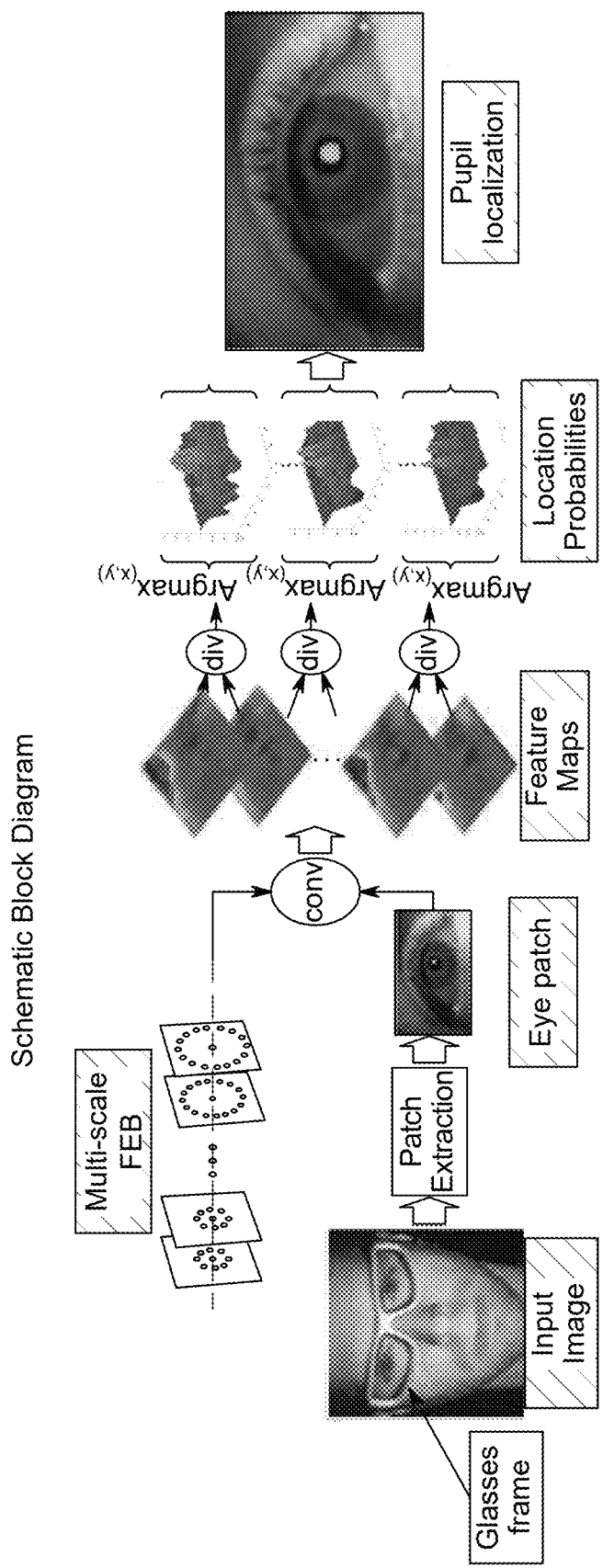
FIG. 6 illustrates a schematic block diagram for determining pupil localization according to one embodiment.
Figure 14:
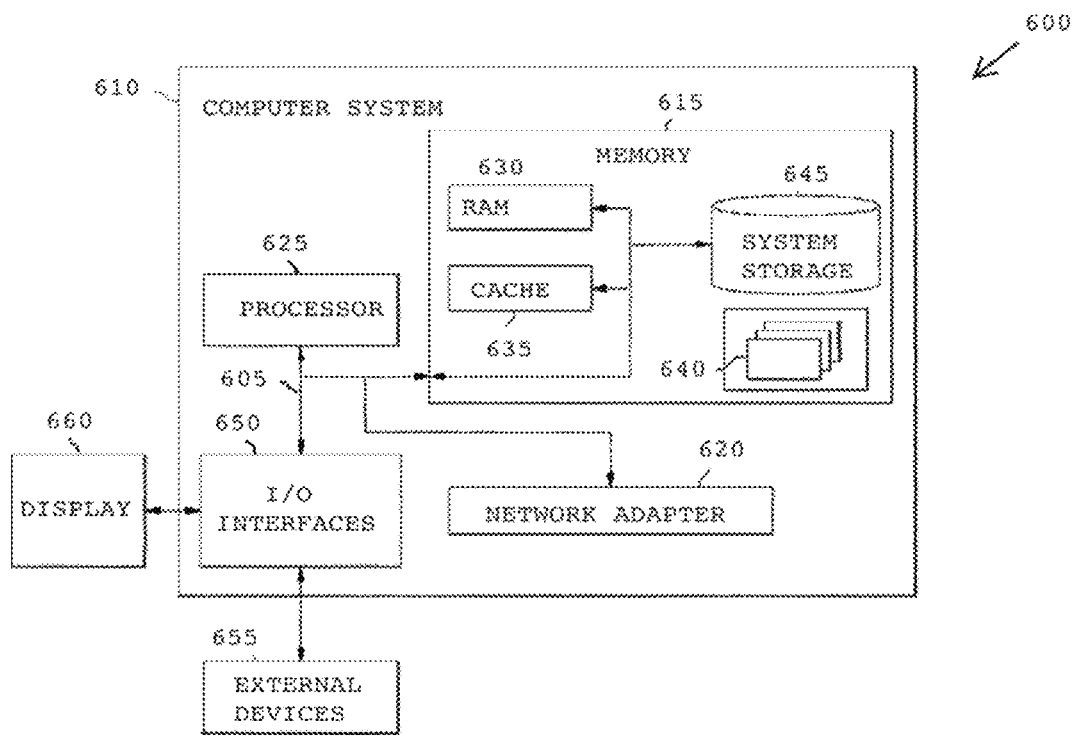
FIG. 14 illustrates an exemplary computer system.

FIG. 14 is a block diagram of one exemplary computer system or server 600 which may be used to implement the embodiments as described. As shown in FIG. 6, computer system 610 is a general-purpose computing device including, but are not limited to, one or more processors 625, a system memory 615, and a bus 605 that couples system components including memory 615 to processor 625.

Bus 605 represents one or more bus structures chosen from a memory bus or memory controller, a peripheral bus, an accelerated graphics port, and a processor or local bus using known bus architectures. Examples of a bus of known architecture include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 610 typically includes a variety of computer system readable media. Computer-readable medium (also referred to as a processor-readable media) includes any non-transitory (e.g., tangible) medium that participates in providing data (e.g., instructions) that may be read by a computer (e.g., by a processor of a computer). Such a medium may take many forms, including, but not limited to, non-volatile media and volatile media, removable and non-removable media.

System memory 615 can include either or both (RAM) 630 and cache memory 635 and may also include one or more storage systems 645 including a non-removable, non-volatile magnetic media ("hard drive"), a magnetic disk drive ("floppy disk) or an optical drive ("CD-ROM, DVD-ROM or other optical media"). System memory 615 can further include program modules 640 that are configured to include the operating system and other programs needed to carry out the steps of the methods as described.

Computer system 610 can also communicate with one or more external devices 655 such as a keyboard, an image capturing device, a display 660, etc.; one or more devices that enable a user to interact with computer system 610; and/or any devices (e.g., network card, modem, etc.) that enable computer system 610 to communicate with one or more other computing devices. Such communication can occur via Input/Output (I/O) interfaces 650. Computer system 610 can communicate with one or more networks such as a local area network (LAN), a general wide area network (WAN), and/or a public network (e.g., the Internet) via network adapter 620. As depicted, network adapter 620 communicates with the other components of computer system 610 via bus 605. It should be understood that although not shown, other hardware and/or software components can be used in conjunction with computer system 610.

Figure 16:
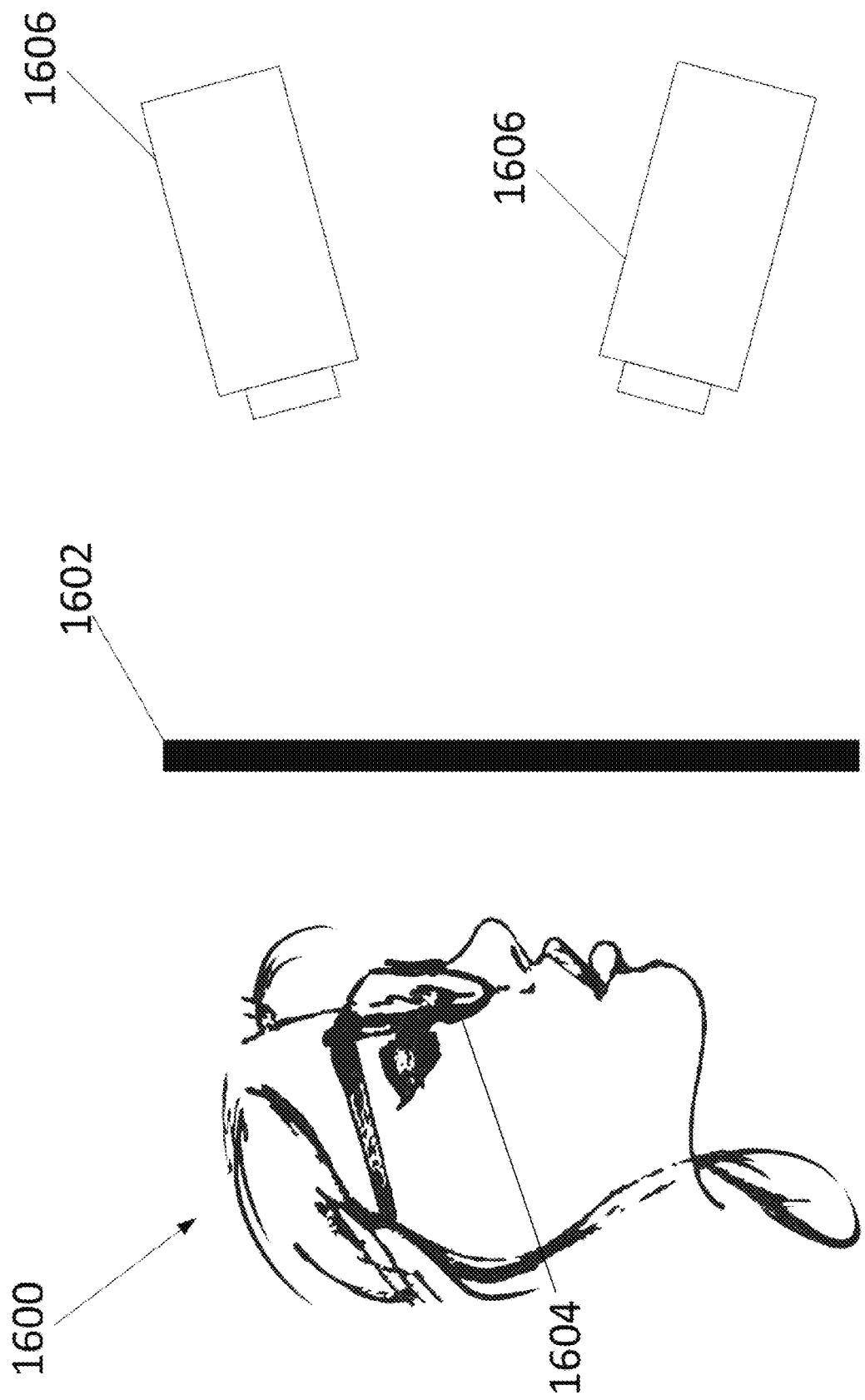
FIG. 16 illustrates a camera mounted behind a mirror that the consumer is using while trying on eyeglass frames.

FIG. 16 is a side view of a person 1600 viewing herself in a mirror 1602 while trying on a pair of eyeglass frames 1604, and a camera 1606 mounted behind the mirror, according to an embodiment. The mirror 1602 and the camera 1606 are configured such that the camera can take one or more images of the person 1600 while the person is viewing herself in the mirror while trying on one or more pairs of eyeglass frames such as the eyeglass frames 1604. Although the camera 1606 is shown as being mounted directly behind the mirror 1602, the camera can be mounted behind and above, behind and below, or behind and to the sides of the mirror 1602 such that at least some of the light redirected to the camera from the face of the person 1600 and the eyeglass frames 1604 need not pass through the mirror.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed to limit the claims.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method, comprising:
   capturing, by way of one or more cameras, images of a user seamlessly trying on eyeglass frames;
   determining, from one or more of the images, a gaze of the user;
   generating, from the images, multiple dimensions of the eyeglass frames; and
   generating, from the images, the gaze, and the multiple dimensions of the eyeglass frames, multiple measurements of inter-pupillary distance, back vertex distance, and pantoscopic tilt;
   wherein generating an inter-pupillary distance measurement includes at least:
   detecting, from one or more images, a face of the user;
   detecting, from the face of the user, an eye region;
   extracting and normalizing, from the eye region, an eye patch;
   estimating, using a deep convolutional-neural-network (DNN), centers of left and right pupils of eyes of the user; and
   calculating, from the gaze and the estimated left and right pupil centers, a near inter-pupillary distance and a far inter-pupillary distance.

2. The method according to claim 1 wherein the one or more cameras are mounted behind a mirror that is unattached to the eyeglass frames.

3. The method according to claim 1, wherein generating the frame dimensions comprises:
   measuring, from the images, a maximum height of a lens box;
   measuring, from the images, a maximum width of the lens box;
   measuring, from the images, a distance between a left lens box and a right lens box.

4. The method according to claim 1, wherein estimating the centers for the left and right pupils using a DNN comprises:
   generating a feature map; and
   estimating, based upon the feature map, probable locations of the left and right pupil centers.

5. The method according to claim 1, further comprising:
   averaging, across 10-40 images, the estimated left and right pupil centers.

6. The method according to claim 1, wherein generating the pantoscopic tilt measurement comprises:
   measuring, in a natural position of a head of the user, an angle between an optical axis of a lens installed in the eyeglass frames and ga visual axis of an eye of the user.

7. The method according to claim 1, wherein generating the measurement of the back vertex distance comprises:
   measuring, from the images, a distance between a back surface of a lens installed in the eyeglass frames and a front of a cornea of an eye of the user.

8. The method according to claim 1, further comprising:
   measuring, from the images and the gaze, one or more of a far inter-pupillary distance, a near inter-pupillary distance, or a mono-inter-pupillary distance in relation to the existing eyeglass frames.

9. The method according to claim 8, further comprising:
   measuring, from the images, a distance between a center of a pupil of an eye of the user and the eyeglass frames directly below the center of the pupil; and
   measuring, from the images, a distance between the center of the pupil and a lowest point on the eyeglass frames below the pupil.

10. The method according to claim 1, further comprising:
    calculating, from the measurements, the dimensions of the eyeglass frames, and a prescription, a lens fabrication model; and
    sending, via a processor, the lens fabrication model to a lens manufacturer.

11. A system comprising:
a processor; and
a memory for storing computer executable instructions, the processor configured to execute the instructions to:
capture, by way of one or more cameras, images of a user seamlessly trying on eyeglass frames;
determine, from one or more of the images, a gaze of the user;
generate, from the images, a plurality of dimensions of the eyeglass frames; and
generate, from the images, the gaze, and the plurality of dimensions of the eyeglass frames, a plurality of measurements of inter-pupillary distance, back vertex distance, and pantoscopic tilt;
wherein the processor is configured to generate the inter-pupillary distance by executing instructions to:
detect, from one or more images, a face of the user;
detect, from the face of the user, an eye region;
extract and normalize, from the eye region, an eye patch;
estimate, using a deep convolutional-neural-network (DNN), centers of the left and right pupils of eyes of the user; and
calculate, from the gaze and the estimated left and right pupil centers, the inter-pupillary distance.

12. The system according to claim 11, wherein the one or more cameras are mounted behind a mirror that is remote from the eyeglass frames.

13. The system according to claim 11, wherein the processor is configured to further execute instructions to:
measure, from the images, a maximum height of one of a left lens box and a right lens box;
measure, from the images, a maximum width of the one of the left lens box and the right lens box; and
measure, from the images, a distance between the left lens box and the right lens box.

14. The system according to claim 11, wherein the processor is configured to:
estimate the centers for the left and right pupils using a DNN by executing instructions to generate a feature map; and
estimate, based upon the feature map, probable locations of the left and right pupil centers.

15. The system according to claim 11, wherein the processor is configured to further execute instructions to average, across 10-40 images, the estimated left and right pupil centers.

16. The system according to claim 11, wherein the processor is configured to generate the pantoscopic tilt measurement by executing instructions to measure, in a natural head position of the user, an angle between an optical axis of a lens fixed to the eyeglass frames and a visual axis of an eye of the user.

17. The system according to claim 11, wherein the processor is configured to generate the back vertex distance by executing instructions to measure, from the images, a distance between a back surface of a lens fixed to the eyeglass frames and a front of a cornea of an eye of the user.

18. The system according to claim 11, wherein the processor is configured to further execute instructions to:
measure, from the images and the gaze, one or more of a far inter-pupillary distance, a near inter-pupillary distance, or a mono-inter-pupillary distance in relation to the existing eyeglass frames.

19. The system according to claim 11, wherein the processor is configured to further execute instructions to:
measure, from the images, a distance between a center of a pupil of an eye of the user and the eyeglass frames directly below the center of the pupil; and
measure, from the images, a distance between the center of the pupil and a lowest point on the eyeglass frames below the pupil.

20. The system according to claim 11, wherein the processor is further configured to:
calculate, from the measurements, the frame dimensions, and a prescription, a lens-fabrication model; and
send the lens-fabrication model to a lens manufacturer.

* * * * *